United States Patent
Dabrowski

(10) Patent No.: US 10,042,331 B2
(45) Date of Patent: Aug. 7, 2018

(54) SENSOR NETWORK AND A METHOD FOR DETECTING AN EVENT IN A SENSOR NETWORK

(71) Applicant: ADVANCED DIGITAL BROADCAST S.A., Chambesy (CH)

(72) Inventor: Bartosz Dabrowski, Zielona Gora (PL)

(73) Assignee: ADVANCED DIGITAL BROADCAST S.A., Eysins (CH)

(*) Notice: Subject to any disclaimer, the term of this patent is extended or adjusted under 35 U.S.C. 154(b) by 0 days.

(21) Appl. No.: 15/372,421

(22) Filed: Dec. 8, 2016

(65) Prior Publication Data

US 2017/0168464 A1    Jun. 15, 2017

(30) Foreign Application Priority Data

Dec. 12, 2015 (EP) .................................. 15199694

(51) Int. Cl.

| G08B 19/00  | (2006.01) |
| G05B 13/02  | (2006.01) |
| H04L 29/08  | (2006.01) |
| G08B 13/196 | (2006.01) |
| G08B 13/22  | (2006.01) |

(52) U.S. Cl.
CPC ...... *G05B 13/021* (2013.01); *G08B 13/19634* (2013.01); *G08B 13/19639* (2013.01); *G08B 13/19695* (2013.01); *G08B 13/22* (2013.01); *H04L 67/12* (2013.01)

(58) Field of Classification Search
CPC ........................ G05B 13/021; G08B 13/9695
USPC .............. 340/521, 540, 541; 348/159, 221.1
See application file for complete search history.

(56) References Cited

U.S. PATENT DOCUMENTS

| 2004/0080627 A1* | 4/2004  | Kroll   | G08B 13/19632 348/221.1 |
| 2012/0313785 A1* | 12/2012 | Hanson  | G08B 21/24 340/573.1    |
| 2016/0105644 A1* | 4/2016  | Smith   | H04N 5/23206 348/159    |
| 2016/0266577 A1* | 9/2016  | Kerzner | G05D 1/0022             |
| 2017/0024987 A1* | 1/2017  | Lin     | H04N 7/186              |

* cited by examiner

*Primary Examiner* — Tai T Nguyen
(74) *Attorney, Agent, or Firm* — Mark M. Friedman

(57) ABSTRACT

A sensor network comprising a first sensor (104) and a second sensor (101, 108), characterized in that: the first sensor (104) and the second sensor (101, 108) are configured to detect an event and to generate a message (M1, M2, M3) corresponding to the detected event; and wherein the sensor network is configured to provide an assessment of the message (M1) from the first sensor (104) based on the message (M2, M3) from the second sensor (101, 108).

12 Claims, 3 Drawing Sheets

SENSOR NETWORK AND A METHOD FOR DETECTING AN EVENT IN A SENSOR NETWORK

TECHNICAL FIELD

The present disclosure relates to a sensor network and a method for detecting an event in a sensor network. In particular, it relates to a sensor network in a surveillance system.

BACKGROUND

Surveillance or monitoring systems known in the art contain a plurality of devices that monitor activity in respective areas or ranges. These devices are called sensors. The sensors are connected to one or more hubs that process signals provided by those sensors and react upon the activation of a sensor. The reaction may differ, depending on the type of sensor and the type or parameters of the signal sent by the sensor. For example, the hub may activate an audiovisual alarm based on detection of motion by a sensor.

The existing solutions are based on the assumption that the sensors remain active at all times and that the sensors are at all times ready to send signals to the hub. Although being very sensitive, this solution is significantly power-consuming, as it requires keeping all sensors powered on at all times.

A patent application GB2379354A presents a system that allows for adjustment of the sensitivity of the sensors depending on the captured signal. In the event that the control unit detects activity within the field of view of one of the cameras, it transmits a signal to that particular camera to switch its mode to high resolution.

However, the known solutions are still based on a central system entirely and provide no means of adjustment of that system in respect to the changing conditions.

There is a need for an improved sensor network and a method for detecting an event in a sensor network that would allow for lower energy consumption and operation that is less demanding computationally.

SUMMARY

The present disclosure relates to a sensor network comprising a first sensor (104) and a second sensor (101, 108), wherein: the first sensor (104) and the second sensor (101, 108) are configured to detect an event and to generate a message (M1, M2, M3) corresponding to the detected event; and wherein the sensor network is configured to provide an assessment of the message (M1) from the first sensor (104) based on the message (M2, M3) from the second sensor (101, 108).

Preferably, the assessment is provided by at least one of the sensors (101, 104, 108).

Preferably, the network further comprises a third sensor (111) adapted to provide an assessment of the message (M1) from the first sensor (104).

Preferably, the assessment comprises a confirmation or a negation of the occurrence of the detected event.

Preferably, the second sensor (101, 108) is configured to operate in at least a first operation mode (103, 110) and a second operation mode (102, 109), wherein the first sensor (104) is configured to trigger a change of the second sensor (101, 108) from the first operation mode (103, 110) to the second operation mode (102, 109) upon sensing a predetermined event.

Preferably, the second sensor (101, 108) is configured to change its operation mode based on the message (M1) from the first sensor (104).

Preferably, the first operation mode (103, 110) and the second operation mode (102, 109) are sensitivity modes.

Preferably, the first operation mode (103, 110) and the second operation mode (102, 109) are power modes.

Preferably, the second sensor (101, 108) is turned off in the first operation mode (103, 110) and turned on in the second operation mode (102, 109).

Preferably, the first sensor (104) is adapted to adjust its trigger threshold in case of negation of the occurrence of the detected event. There is also disclosed a method for sensing an event in a sensor network comprising a first sensor (104) and a second sensor (101, 108), wherein the method comprises steps of: detecting the event by the first sensor (104); sending a message (M1) by the first sensor (104) to the second sensor (101, 108); in response to the received message (M1), triggering a change in the second sensor (101, 108) from a first operation mode (103, 110) to a second operation mode (102, 109); checking whether the second sensor (101, 108) detected the event; and providing a message (M2) with a confirmation or a negation of an occurrence of the event to the sensor network.

There is also disclosed a computer program comprising program code means for performing all the steps of the method as described above when said program is run on a computer, as well as a computer readable medium storing computer-executable instructions performing all the steps of the method as described above when executed on a computer.

BRIEF DESCRIPTION OF DRAWINGS

These and other objects of the invention presented herein, are accomplished by providing a sensor network and method for detecting an event in a sensor network. Further details and features of the present invention, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

DETAILED DESCRIPTION

Figure 1:
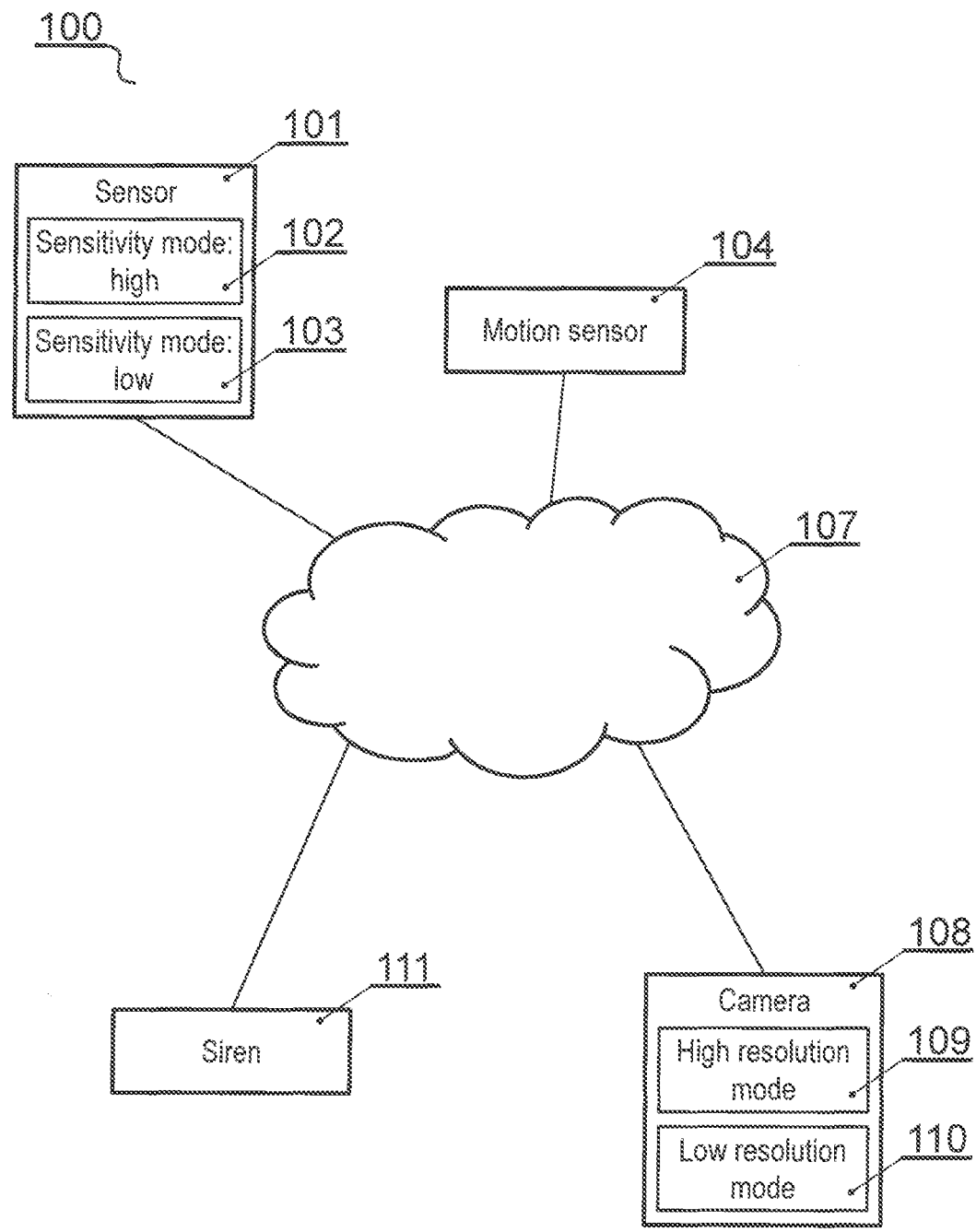
FIG. 1 presents an example of a sensor network.

FIG. 1 presents an example of a sensor network. The network 100 comprises a plurality of sensors 101, 104, 108, 111 connected to a transmission medium 107. Any device connected to the system can be considered a sensor. It is not essential whether the sensor can process input or output signals from other sources than the transmission medium 107. An example of a sensor able to process input from other media than 107 is an infrared motion sensor. An example of a sensor unable to process input from other media than 107 is a siren. Each sensor may further operate in one or more sensitivity modes 102, 103 or power modes or the like. The transmission medium 107 may be a dedicated bus or Ethernet network or Internet network or the like, suitable to provide exchange of data.

Each sensor is capable of receiving and sending messages. It is not essential how the messages are built or what data is carried by them. Each message may be a source message or a response. The source message is a message that is triggered by a sensor detecting a condition (an event). The response message is a message triggered by another message. Each response message may contain one or more references or copies or the like of the messages that that message is a response to.

In one embodiment, each response message may contain a full list of previous responses up to the point of the source message, including the source message. In another embodiment, each message can be identified with a substantially unique identifier generated by the sensor sending the message. An example of such substantially unique identifier is a Universally Unique Identifier (UUID). Each response includes a list of UUID of each message preceding that response up to the point of the source message.

The references or copies or the like of the messages that a message is a response to may be used by a sensor that receives the response to identify whether the response was triggered by this sensor's source message. This in turn may trigger further actions. An example of further action may be adjustment of the sensor's sensitivity. Other exemplary actions will become apparent from the descriptions of the exemplary embodiments that follow.

The sensor network is adapted to provide an assessment of the message from a first sensor based on the message from a second sensor. At least one of the sensors comprised in the network is adapted to provide the assessment. The assessment comprises a confirmation in a form of a positive feedback message or a negation in a form of a negative feedback message. Prior to the assessment, the second sensor may, upon receiving the message from the first sensor, switch its operating mode from a first operation mode to a second operation mode. This can further enhance the reliability of detecting the event, while consuming less energy and computational resources in-between events.

Each response contains feedback information. The feedback is a piece of information about detection or lack of detection of a particular condition. One example of feedback may comprise information on detection of motion measured by a camera. This feedback, when included in a response to an activation of a motion sensor, can be interpreted by that motion sensor. A positive feedback is a confirmation of the information contained in the original message that this feedback is a response to. The positive feedback can reinforce the mechanism (consider it more reliable, and for example maintain its sensitivity) that triggered the response. The negative feedback is a contradiction of the information contained in the original message that this feedback is a response to and can diminish (e.g. by adjustment) the mechanism that triggered the response.

Each sensor 101, 104 can send a message via the transmission medium 107 upon activation or switching to a different operation mode. Each sensor can also receive messages from other sensors. It is in no way limiting to the present invention whether all messages are broadcasted to all sensors or whether the sensors receive messages in groups or individually or the like.

Each sensor that sent a message may expect a response message to be generated after sending a source message and therefore may be prepared to receive that response message. The response message contains feedback information according to the present invention and it is only decided by the sensor how to react to that feedback. In one embodiment a positive feedback contained in the response message may reinforce the mechanism that triggered the sending of the source message. In another embodiment the positive feedback may maintain the mechanism that triggered the sending of the source message. This results in adjustment of the reaction of the sensor towards the trigger that caused the sending of the message.

The sensor network may operate as follows. A motion sensor 104 detects motion. The message is sent and received by all other sensors 101, 108 and 111. This may include a camera 108 that is in the same room and a siren 111. The siren 111 may use a system for dynamic management of resources (such as the one according to the system described in a European patent application EP14198454) to determine that one message from a motion sensor is not enough to cause an alarm. This information though is put into the history data of the siren. The camera 108 receives the message and in response switches to a high resolution mode and starts analyzing the pictures. Two scenarios are possible. In the first scenario the camera 108 detects motion. The camera 108 sends a reply. The reply contains information of the original message triggering the switch. This reply is received by the motion sensor 104 reinforcing the decision mechanism to send the message upon activation or to increase a weight assigned to the message or the like. The same reply is received by the siren 111. The siren adds the message that has just been received to the history, which tops the threshold and starts an alarm. In the second scenario, it is assumed that the camera 108 detects no motion. The camera sends a reply. This reply contains information of the original message triggering the switch. This reply is received by the motion sensor 104 and the motion sensor diminishes the mechanism to send a message upon activation or decreases the weights assigned to the message or the like. The same reply is received by the siren 111. The siren 111 detects the negation of the previous message and clears the history.

It is clear to one skilled in the art that each device needs to contain information about location or obstacles in its proximity or the like so as to be able to determine whether the message from a particular device should or should not trigger any kind of response. An exemplary situation may include two motion sensors located in the same room. A message from one of the motion sensors may cause an action in the other motion sensor, e.g. switching to a high sensitivity mode. Another exemplary situation may comprise two motion sensors located in two different rooms that are not connected by any passage. A message from one sensor will most likely be ignored by the other sensor, as there is no reason why the motion detected by one sensor would propagate to the area covered by the other sensor.

Figure 2:
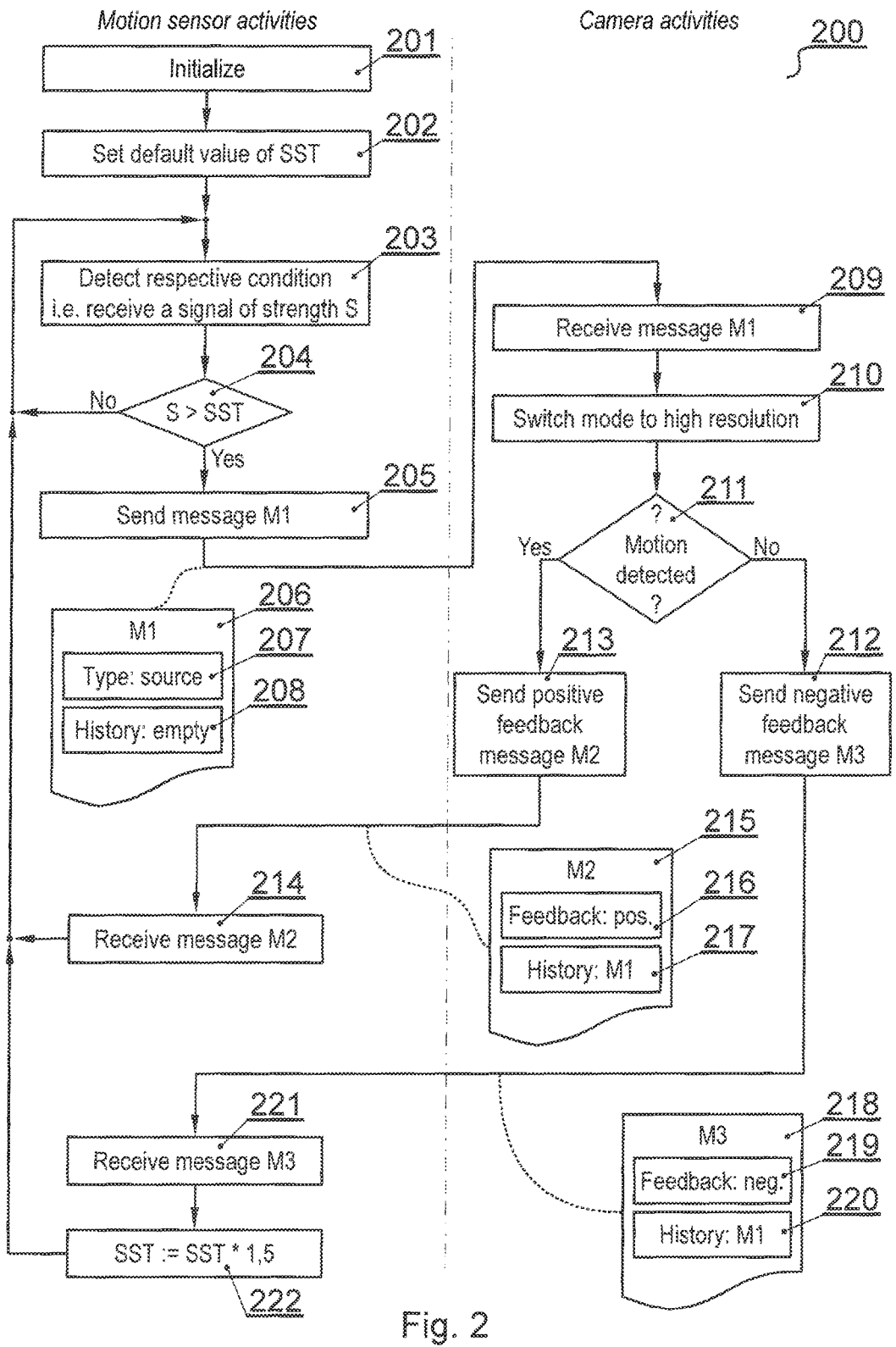
FIG. 2 presents a diagram of the method according to the present invention.

FIG. 2 presents an example of a method 200 for detecting an event. The method begins at step 201 by initialization of a first sensor, in this case a motion sensor. This may be in form of powering on or resetting to a factory default state or the like. The motion sensor sets a default value of SST (Signal Strength Threshold) at step 202. The SST determines the threshold of the received signal strength that causes the sensor to react. Typically, the SST value is selected such that it reflects the highest possible sensitivity. At step 203 the motion sensor detects motion. It determines the strength of the received signal, marked herein as 'S'. At step 204 the strength 'S' of the signal is compared with the SST. If not higher, the motion sensor returns to step 203. If higher, the motion sensor sends a message at step 205. The message M1 206 is information that the motion sensor detected a signal (an event). The message 206 carries data stating that this is a source message 207 and an empty history of messages 208. The message 206 is received by a second sensor, in this case a camera, at step 209. The camera interprets that the massage 206 carries a source message and switches to a high resolution mode at step 210. Next, at step 211 the camera checks whether motion is detected. For example, step 211 can be carried out as described in GB2379354A. If motion is confirmed, then at step 213 the camera sends a positive feedback response 215 to the message 206. This response contains information 216 that the feedback is positive and a history 217 of previous messages, in this case M1. The message 215 is received by the motion sensor at step 214. Since the message 215 contains a positive feedback, nothing is modified in the motion sensor, so as not to make it over-sensitive to motion. Next, the motion sensor returns to detection of motion at step 203. If at step 211 the motion is not confirmed by the camera, another response message is sent at step 212. This response 218 contains negative feedback information 219 indicating that motion was not confirmed and a history 220 of previous messages, in this case M1. The message 218 is received by the motion sensor at step 221. The motion sensor determines the feedback 219 as negative and in order to avoid further false positives increases the value of SST so as to reduce the effective sensitivity of the sensor step 222. Next, the motion sensor returns to detecting motion at step 203. In other embodiments, the positive feedback message M2 can be provided to other, actionable sensors, for example to a siren. Such positive feedback message M2 may be utilized to activate the siren and raise the alarm. It could be also utilized by other elements of a surveillance system.

The scheme of increasing or decreasing of the SST, as well as the initial value, can be determined in various ways and may depend on factors such as the size of the system, the purpose of its adaptability, the nature of the operating conditions or the like. The example presented in FIG. 2 is designed at minimizing false positive notifications of motion done by the system i.e. the motion sensor will increase the SST by a large percentage on a false positive but will not decrease on a confirmed positive.

Another example may include a sensor network system according to FIG. 1 where the method of connecting a new sensor to the system according to FIG. 2 is applied only at the learning stage. After the learning stage, the system may forbid further modifications of the SST value or any other values or a subset of all values or the like. In other words, the adjustment of strength of the threshold is no longer necessary. It is also possible to skip the adjustment steps when using the first and the second sensor, and only utilize predefined values or adjust the threshold by other means.

Figure 3:
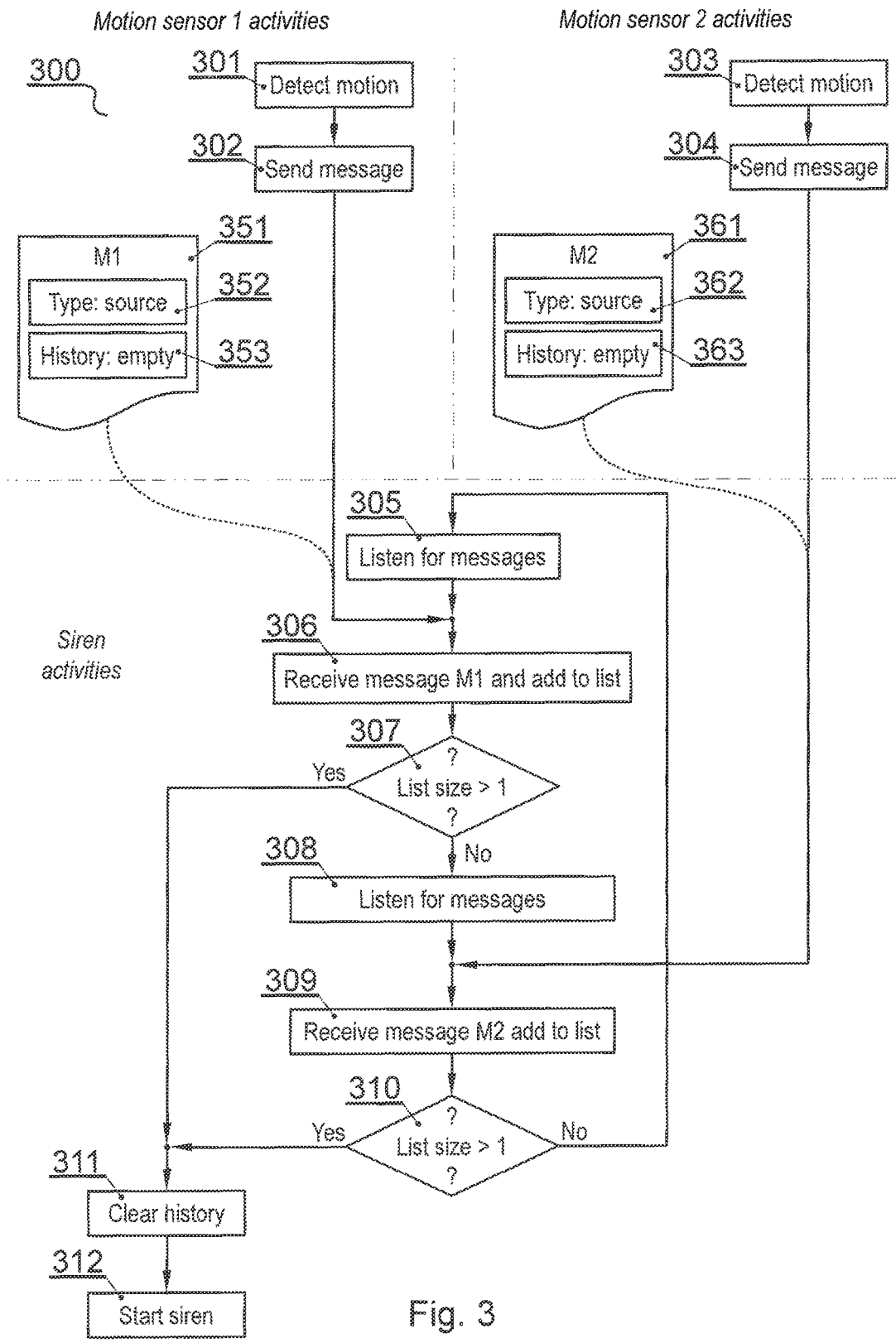
FIG. 3 presents a diagram of another method.

FIG. 3 presents another example of a method 300 for detecting an event. The method presents the activities of two motion sensors, cooperating with a siren. The system may function in conjunction with a system for dynamic management of resources, such as known from the European patent application EP14198454. The third sensor in the present example is assigned the role of a resource manager. The change processed by it is the detection of motion by the motion sensors and the significance is constantly equal to 1 (by this the time dependency is dropped as not relevant). The third sensor forms or keeps or the like and processes the history of activation of the motion sensors. Hence the method starts at step 301 with a first sensor, in this case a motion sensor, detecting motion and sending a corresponding message 351 at step 302. The message contains the type information 352 and an empty message history 353 similarly to the embodiments described above. In parallel, a second sensor, in this case also a motion sensor, detects motion at step 303 and sends a corresponding message 361 at step 304. The message contains the type information 362 and an empty message history 363 similarly to the embodiments described above. Further steps of the method illustrate the ability of a third sensor, in this case a siren, to accept only confirmed signals. Step 305 illustrates the siren listening to incoming messages. At step 306 the message M1 351 is received and added to the list of received messages. At step 307 the size of the received message list is checked. If larger than 1, the flow moves to step 311. If not larger than 1, the flow moves to step 308 and then to step 309 where the message M2 361 is received and added to the received message list. At step 310 the size of the received message list is checked. If not larger than 1, the siren listens to further messages returning to step 305. If larger than 1, the history is cleared or cached or stored in a database or the like at step 311 and the siren emits an audiovisual signal at step 312. In other words, the third sensor provides an action upon confirming the occurrence of a predetermined event, wherein the event sensed by the first sensor is confirmed by the second sensor. This enhances the reliability of operation of the sensor network.

Further modification of the presented embodiments may comprise modification of the sensitivity of the siren, i.e. the history size at steps 307 and 309 to allow adapting to certain level of confidence of the received messages. This may be achieved according to method of FIG. 2.

The present invention allows for automatic operation of a sensor network system without the need for a central hub. This makes updates of the system capacity non-intrusive towards its structure and allows for automatic calibration.

The implementation of the invention is effected by the particular computer systems and computer-executed methods. Thus the machine or transformation test is therefore fulfilled and the idea is not abstract.

It can be easily recognized, by one skilled in the art, that the aforementioned system and method for detecting an event in a sensor network may be performed and/or controlled by one or more computer programs. Such computer programs are typically executed by utilizing the computing resources of the device. The computer programs can be stored in a non-volatile memory, for example a flash memory or in a volatile memory (or otherwise a non-transitory computer readable medium), for example RAM and are executed by the processing unit. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

In addition, any combination of the appended claims in envisaged in the present application.

The invention claimed is:

1. A sensor network comprising:
a first sensor configured to detect an event and to generate a message corresponding to the detected event; and
a second sensor
configured to detect the same event as the first sensor and to generate a message corresponding to the detected event,
wherein the sensor network is configured to provide an assessment of the message from the first sensor based on the message from the second sensor.

2. The sensor network according to claim 1, wherein the assessment is provided by at least one of the sensors.

3. The sensor network according to claim 1, further comprising a third sensor adapted to provide an assessment of the message from the first sensor.

4. The sensor network according to claim 1, wherein the assessment comprises a confirmation or a negation of an occurrence of the detected event.

5. The sensor network according to claim 1, wherein the second sensor is configured to change its operation mode based on the message from the first sensor.

6. The sensor network according to claim 1, wherein the first operation mode and the second operation mode are sensitivity modes.

7. The sensor network according to claim 1, wherein the first operation mode and the second operation mode are power modes.

8. Sensor network according to claim 1, wherein the second sensor is turned off in the first operation mode and turned on in the second operation mode.

9. The sensor network according to claim 4, wherein the first sensor is adapted to adjust its trigger threshold in case of negation of the occurrence of the detected event.

10. The sensor network of claim 1, wherein each of the messages includes a history portion, and wherein the history portion of the message from the second sensor includes at least the message from the first sensor.

11. A method for event detection in a sensor network comprising a first sensor and a second sensor, the method of comprising:
detecting an event by the first sensor;
sending a message by the first sensor to the second sensor;
in response to the received message, triggering a change in the second sensor from a first operation mode to a second operation mode wherein the sensor network is configured to provide an assessment of the message from the first sensor based on the message from the second sensor;
checking whether the second sensor detected the same event detected by the first sensor; and
providing a message with a confirmation or a negation of an occurrence of the event to the sensor network.

12. A non-transitory computer readable medium storing computer-executable instructions performing all the steps of the method according to claim 11 when executed on a computer.

* * * * *